March 8, 1927.

O. A. PRICE 1,620,131

AUTOMATIC SELF CLOSING VALVE

Filed June 26, 1926

4 Sheets-Sheet 1

*INVENTOR*
OWEN ALFRED PRICE
BY *Featherstonhaugh & Co*
*ATTORNEYS*

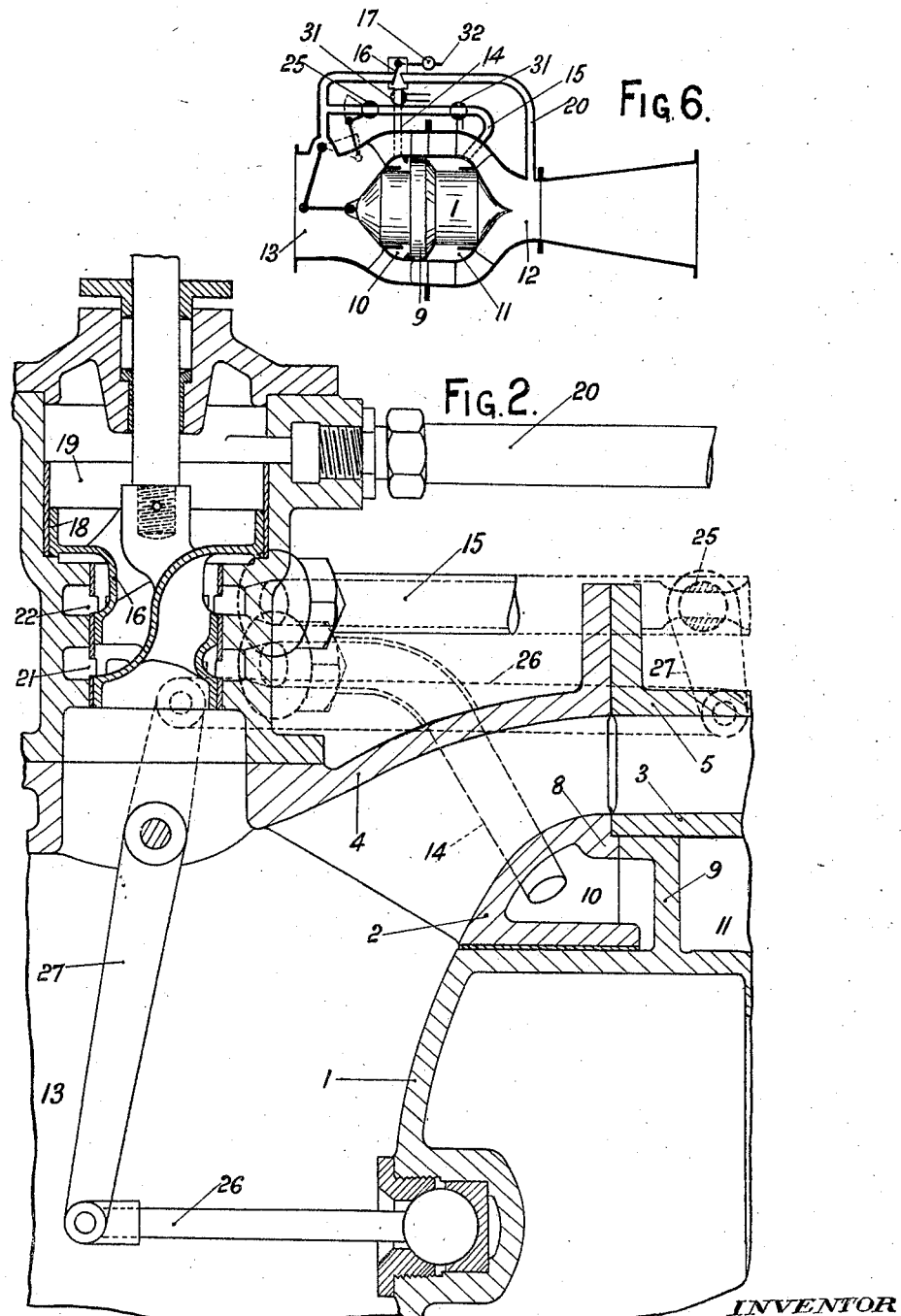

March 8, 1927.  1,620,131
O. A. PRICE
AUTOMATIC SELF CLOSING VALVE
Filed June 26, 1926  4 Sheets-Sheet 3

INVENTOR
OWEN ALFRED PRICE
BY Fetherstonhaugh & Co
ATTORNEYS

March 8, 1927.

O. A. PRICE

AUTOMATIC SELF CLOSING VALVE

Filed June 26, 1926

1,620,131

4 Sheets-Sheet 4

INVENTOR
OWEN ALFRED PRICE
BY Fetherstonhaugh & Co
ATTORNEYS

Patented Mar. 8, 1927.

1,620,131

UNITED STATES PATENT OFFICE.

OWEN ALFRED PRICE, OF KILMARNOCK, SCOTLAND.

AUTOMATIC SELF-CLOSING VALVE.

Application filed June 26, 1926, Serial No. 118,351, and in Great Britain June 27, 1925.

This invention relates to an automatic self-closing valve adapted to cut off the flow of fluid in the event of extraordinary rates of flow, or drops of pressure occurring outside the limits of a predetermined range. Such a valve may be installed as an automatic safety device to prevent damage or waste of water in the event of a burst main, or in a hydro-electric station to avoid destruction caused by the escape of high pressure water in case a penstock bursts or the turbine casings, generators or runners break down. In such cases the valve is only called upon to operate in the rare event of an accident and the utmost reliability is necessary; it is also important that the number of parts be a minimum and the action of extreme simplicity.

The invention consists broadly in an automatic self-closing valve comprising a plunger movable axially in a main channel in the vicinity of a zone of less cross-sectional area than the main channel and subject on its rear face to the reaction of the flowing stream, the plunger being provided with a piston member forming a partition between front and rear chambers in which, in the open position of the valve different pressures prevail, the pressure in the front chamber being then any pressure in excess of that in the rear chamber, with means automatically operative on change of the conditions of flow to change the pressure conditions in either or both chambers to make the pressure in the front chamber equal to or less than that in the rear chamber.

Figure 1:
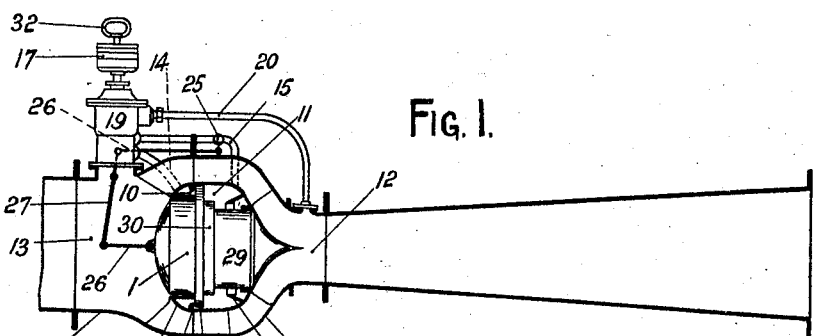
Figure 3:
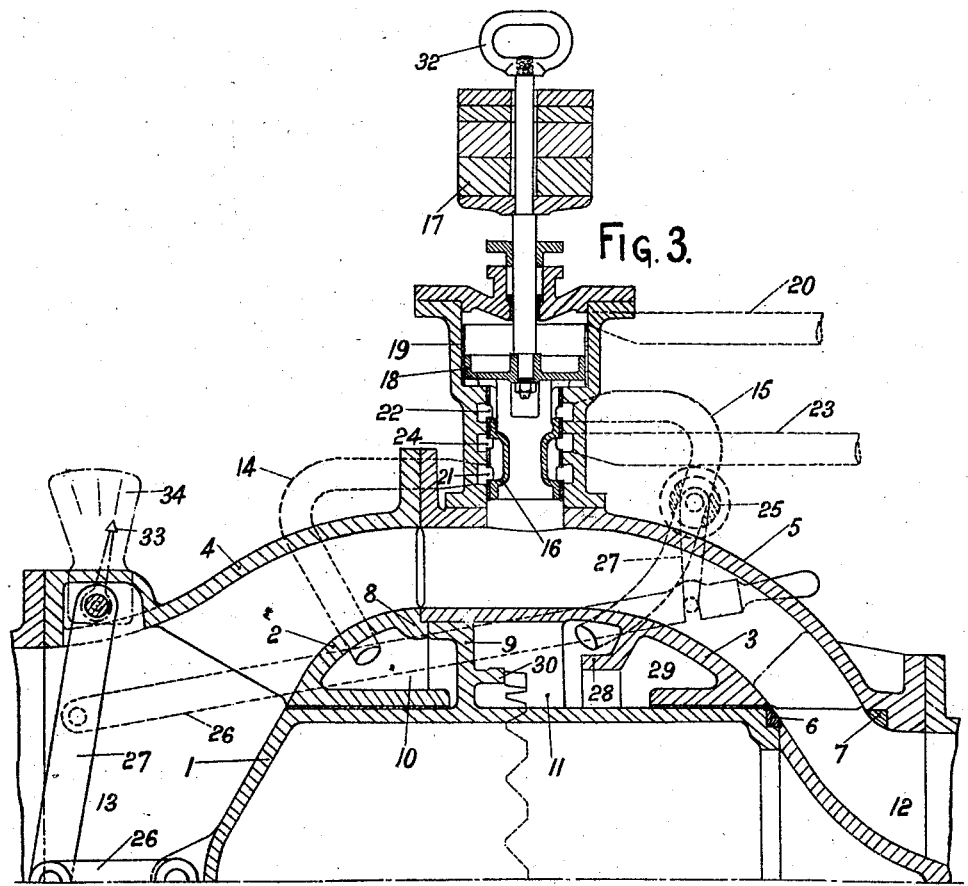
Figures 9, 10:
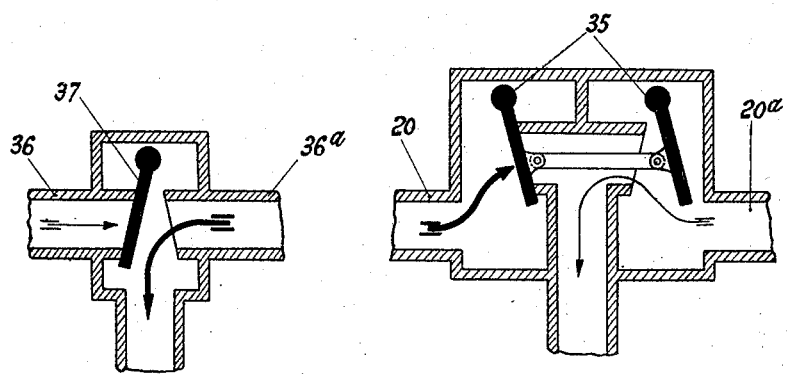

In the accompanying drawings, Fig. 1 is a diagrammatic view of an automatic self-closing valve according to the invention.
Fig. 2 is a section showing in detail part of the valve represented in Fig. 1. Fig. 3 is a fragmentary section of a modification; Figs. 4 to 8 are views similar to Fig. 1 showing further modifications; Figs. 9 and 10 are detail views of flap valves employed in the modifications shown in Figs. 7 and 8.

The valves shown in Figs. 1 to 6 each comprise a cylindrical plunger 1, or valve proper, housed in and free to move axially of an annular casing 2, 3 open at both ends and coaxial with an outer shell 4, 5, the space between the casing 2, 3 and shell 4, 5 forming the waterway. The plunger 1 is fitted with a valve ring 6 (see Fig. 3) adapted, in the forward position of the plunger 1, to engage with a seat ring 7 fitted in the section 5 of the shell. When at its extreme rearward limit the plunger makes contact with a stop 8 in the section 2 of the casing, and it then forms in conjunction with the casing 2, 3 an approximately stream-lined body disposed axially of the waterway.

Between the casing 2, 3 and the plunger 1 is an enclosed space which receives a piston 9 stepped out from the plunger 1 and dividing the space into two chambers 10, 11, and forming, in effect, a servo-motor for control of the valve movement.

To obtain a pressure difference for the control of the main valve there is provided in the waterway a throat 12 in which is set up a lower pressure than prevails in the main 13.

Leading to the chambers 10 and 11 are pipes 14, 15 controlled by a pilot valve 16 which is loaded by an adjustable external weight 17 so that during normal flow it occupies a position in which the chamber 10 is open to the throat pressure and the chamber 11 is open to the higher main pressure, whereby the plunger 1 is maintained in its rearmost position. With a given excess in the rate of flow the differential pressure between the throat 12 and main 13 is increased and the weight 17 is overcome so that the valve 16 is displaced to a position in which the chamber 10 is brought into communication with the main 13, and, in the forms shown in Figs. 1 to 4, the chamber 11 is brought into communication with the throat 12, whereby the main valve is closed; in the forms shown in Figs. 5 and 6, the chamber 11 is maintained in communication with the main 13, the excess pressure on the back of the plunger 1 sufficing to close the main valve.

The pilot valve shown in Figs. 1 and 2 is constituted as a piston valve 16 controlled by a piston 18 solid with the valve 16 and movable in a cylinder 19 the upper end of which is in communication with the throat 12 by way of a pipe 20 and the lower end of which is in communication with the main 13 by way of a passage through the valve 16. The pipes 14 and 15 are led, respectively, to ports 21 and 22 in the pilot valve casing, each of which ports is in communication with either the main 13 or the throat 12 according to the position of the pilot valve.

Figure 4:
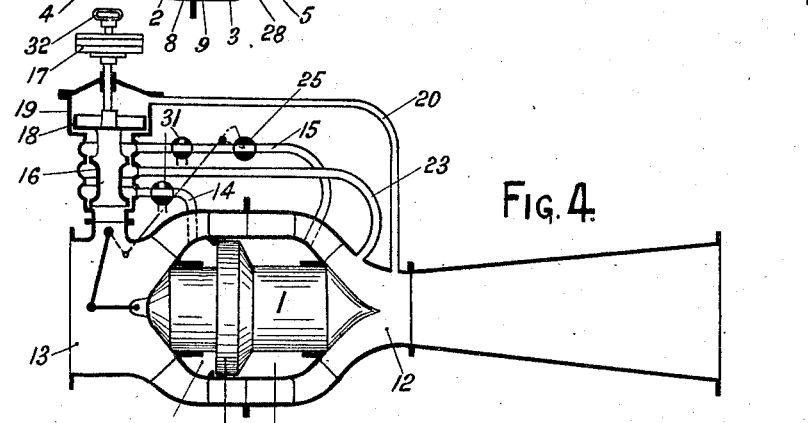

The pilot valves shown in Figs. 3 and 4 are also piston valves, each solid with a controlling piston 18 movable in a cylinder 19, the upper end of which is connected to the throat 12 by way of the pipe 20. In the normal position of the valve 16 the chamber 10 communicates with the throat 12 by way of the pipe 14 and a pipe 23 interconnecting the throat 12 and ports 24 in the pilot valve casing.

Figure 5:
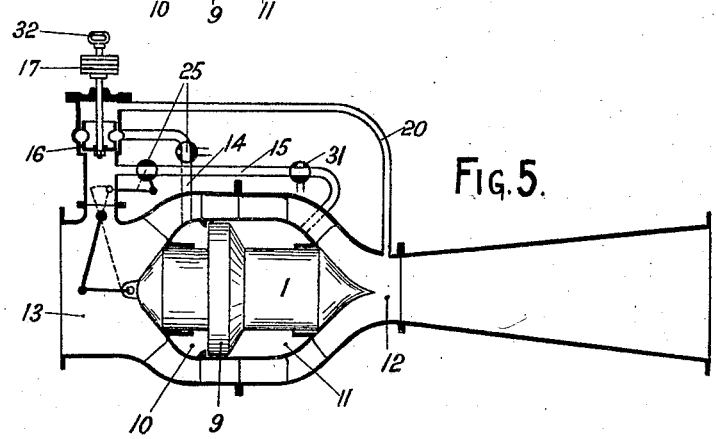

The pilot valve shown in Fig. 5 is constituted as a loaded lift valve 16 which, when raised from its seat on increase of the differential pressure, interrupts communication between the chamber 10 and the throat 12 and establishes communication between the chamber 10 and the main 13, the chamber 11 being in uninterrupted communication with the main.

The connection of the pipe 20 to the throat may be as shown in full lines in Figure 5.

The pilot valve 16 shown in Fig. 6 is constituted as a flap valve corresponding in function to the pilot valve shown in Fig. 5, the flap valve being loaded by an external weight.

To prevent any possibility of slam when closing, in each of the constructions shown there is interposed in the pipe 15 a throttle 25 connected by articulated links 26 and levers 27 to the plunger 1 and serving, as the plunger 1 moves towards closing position, to restrict progressively the passage afforded to water expelled from the chamber 11. Additional cushioning is encountered by the plunger 1 as it nears closing position due to the formation by an annular flange 28 integral with the casing 3 of a dashpot chamber 29 into which an annular rib 30 on the plunger 1 is adapted to enter pistonwise. As shown in Fig. 3, the rib 30 may be serrated to obviate the risk of shock.

To permit hand control of the main valve when required, exhaust cocks 31 are fitted to the pipes 14 and 15 (see Figs. 4 to 8). A lifting handle 32 is attached to the pilot valve 16.

As shown in Fig. 3, a pointer 33 solid with the lever 27 and co-operating with a suitably inscribed plate 34 serves to indicate the position of the plunger 1 in the casing 2, 3.

When self-closing in each direction of flow is required, a so-called double-ended valve may be installed. Two typical constructions of double-ended valves are shown in Figs. 7 and 8.

The double-ended valves shown each comprise duplicate plungers 1, 1ª relatively disposed at 180° and adapted to function independently of one another. 16 denotes a pilot valve common to both valve elements. A pipe 20 or 20ª is connected to each throat 12, and the lower pressure throat is maintained in communication with the pilot valve casing by means of a double flap valve device 35, shown in detail in Fig. 9. A pipe 36 or 36ª is connected to each main 13 and the higher pressure zone is maintained in communication with the pilot valve casing and chambers 10, 10ª, by means of a flap valve device 37, shown in detail in Fig. 10.

Figure 7:
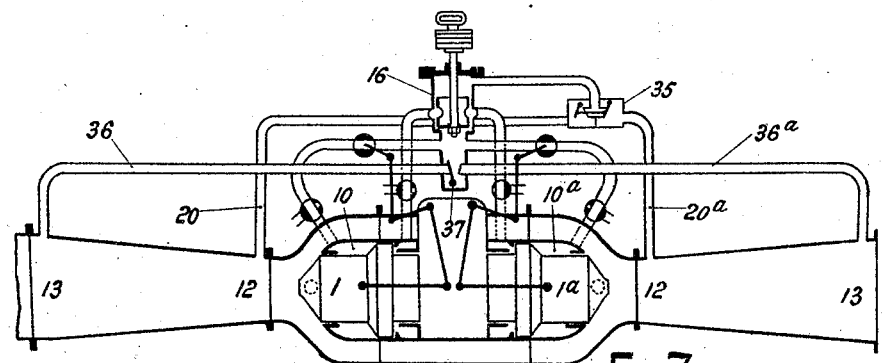
Figure 8:
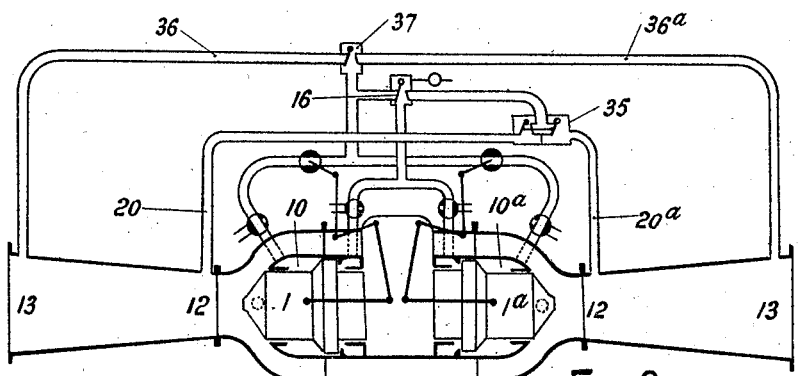

As shown in Figs. 7 and 8, a non-return valve 1ᵇ may be fitted at the nose of each plunger 1 or 1ª to permit the full reaction pressure due to the velocity in the upstream main to penetrate to the back of the particular plunger called upon to close automatically.

From the description given of the valves shown in Figs. 1 to 6, the operation of a double-ended valve such as shown in Fig. 7 or Fig. 8 will be apparent.

What I claim is:—

1. In an automatic self-closing valve, in combination with a fluid conduit including a main channel and a zone of less cross-sectional area, there being unequal pressures in said main channel and said zone, a valve-forming plunger movable axially in said channel in the vicinity of said zone, said plunger having its closing movement in the direction towards said zone, said plunger being subject on its rear face to the reaction of the flowing stream, a shell surrounding said plunger and spaced from the inner wall of said channel, a piston movable with said plunger and separating front and rear chambers subject in the open position of the valve to said unequal pressures, and means automatically operative on change of the conditions of flow to change the relative pressure conditions in said chambers.

2. In an automatic self-closing valve, in combination with a fluid conduit including a main channel and a zone of less cross-sectional area, there being unequal fluid pressures in said zone and said main channel, a valve-forming plunger movable axially in said channel in the vicinity of said zone, said plunger having its closing movement in the direction towards said zone, said plunger being subject on its face remote from said zone to the reaction of the flowing stream, a shell surrounding said plunger and spaced from the inner wall of said channel, a piston movable with said plunger affording in conjunction with said shell and said plunger front and rear compartments, connections between said compartments and the main channel and said zone, and a pilot valve dependent for its operation on changes in the conditions of flow for controlling said connections.

3. In an automatic self-closing valve, in combination with a fluid-conducting channel including a main channel and a zone of less cross-sectional area, there being unequal pressures in said main channel and said zone, a valve-forming plunger movable axially in said channel in the vicinity of said zone, said plunger having its closing movement in the direction towards said zone, said plunger being subject on one face to the reaction of the flowing stream, a shell surrounding said plunger and spaced from the inner wall of said channel, a piston movable with said plunger separating front and rear compartments, connections between said compartments and said main channel and said zone, a pilot valve dependent for its operation on changes in the conditions of flow for controlling said connections, and a throttle device interposed in one of said connections, said device being operatively connected to said plunger.

4. In an automatic self-closing valve, in combination with a fluid conduit comprising a main channel and a zone of less cross-sectional area, there being unequal pressures in said main channel and said zone, a valve-forming plunger movable axially in said channel in the vicinity of said zone, said plunger having its closing movement in the direction towards said zone, a shell surrounding said plunger and spaced from the inner wall of said conduit, a piston stepped out from said plunger and separating front and rear chambers subject in the open position of the valve to said unequal pressures, means automatically operative on change of the conditions of flow to change the relative pressure conditions in said chambers, and thereby effect closing movement of said plunger, and means for cushioning the closing movement of said plunger.

In testimony whereof I have signed my name to this specification.

OWEN ALFRED PRICE.